Inventors
FRANK J. VIERLING
JAMES JESSEN
Attorneys

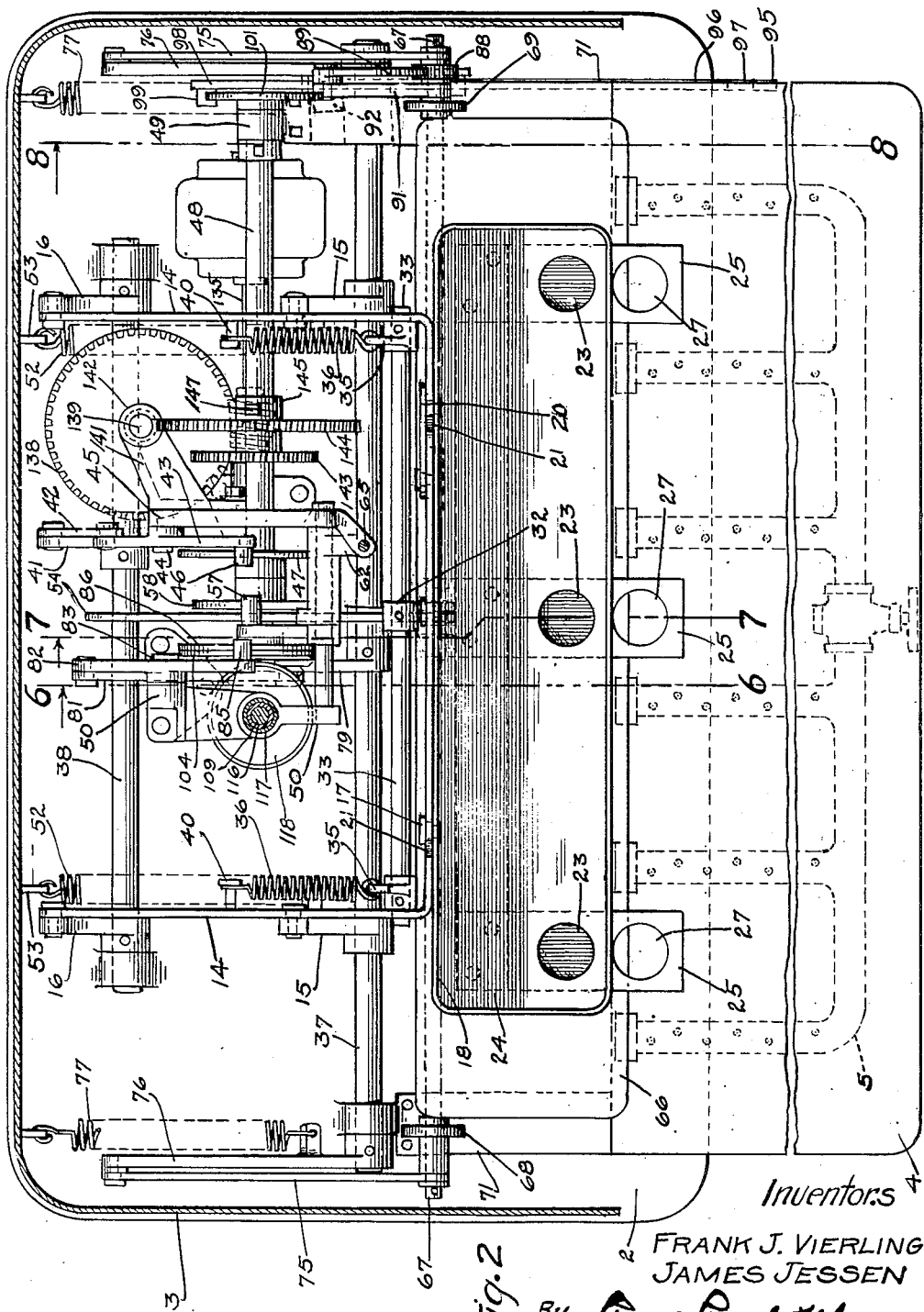

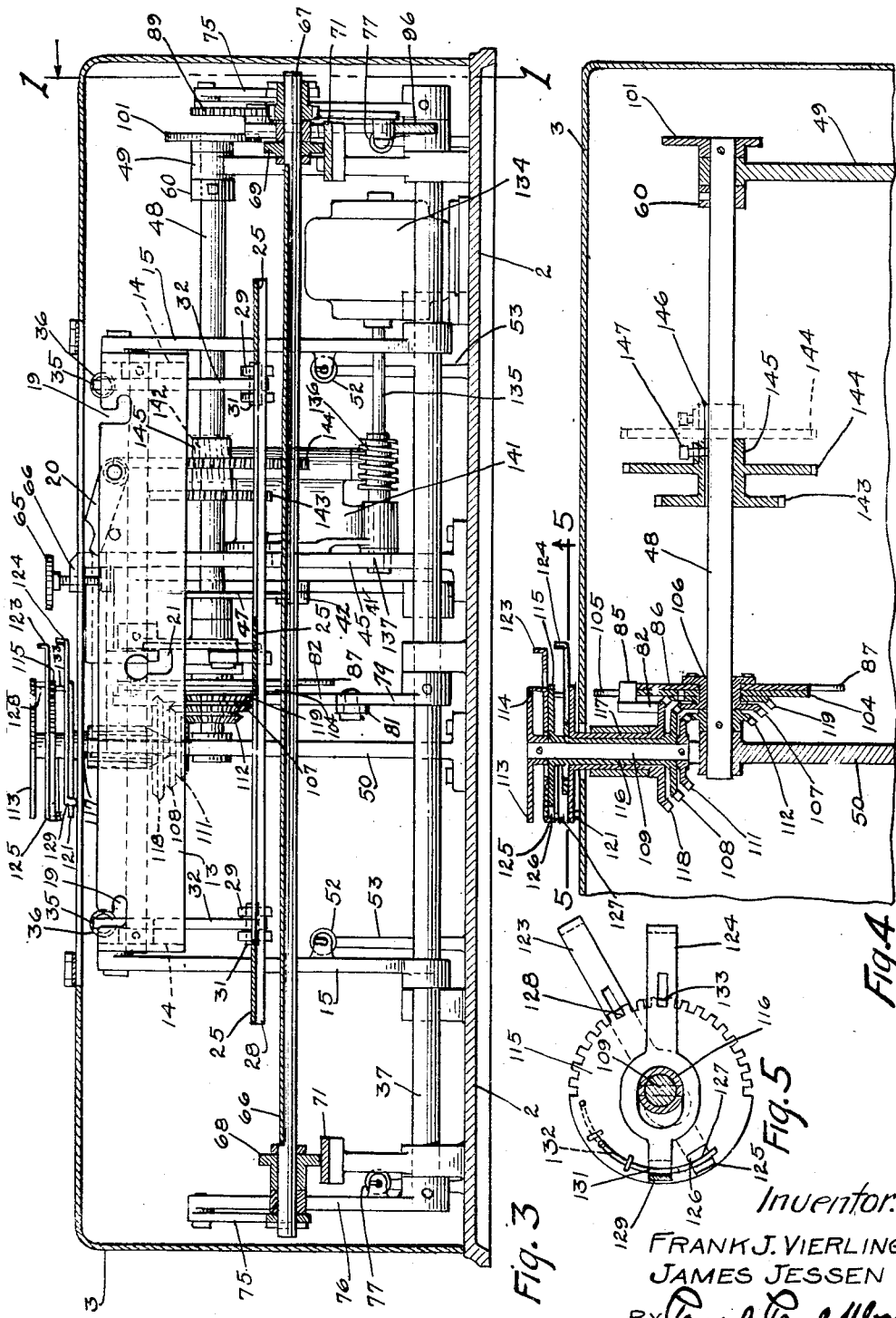

Inventors
FRANK J. VIERLING
JAMES JESSEN
By Paul, Paul & Moore
attorneys.

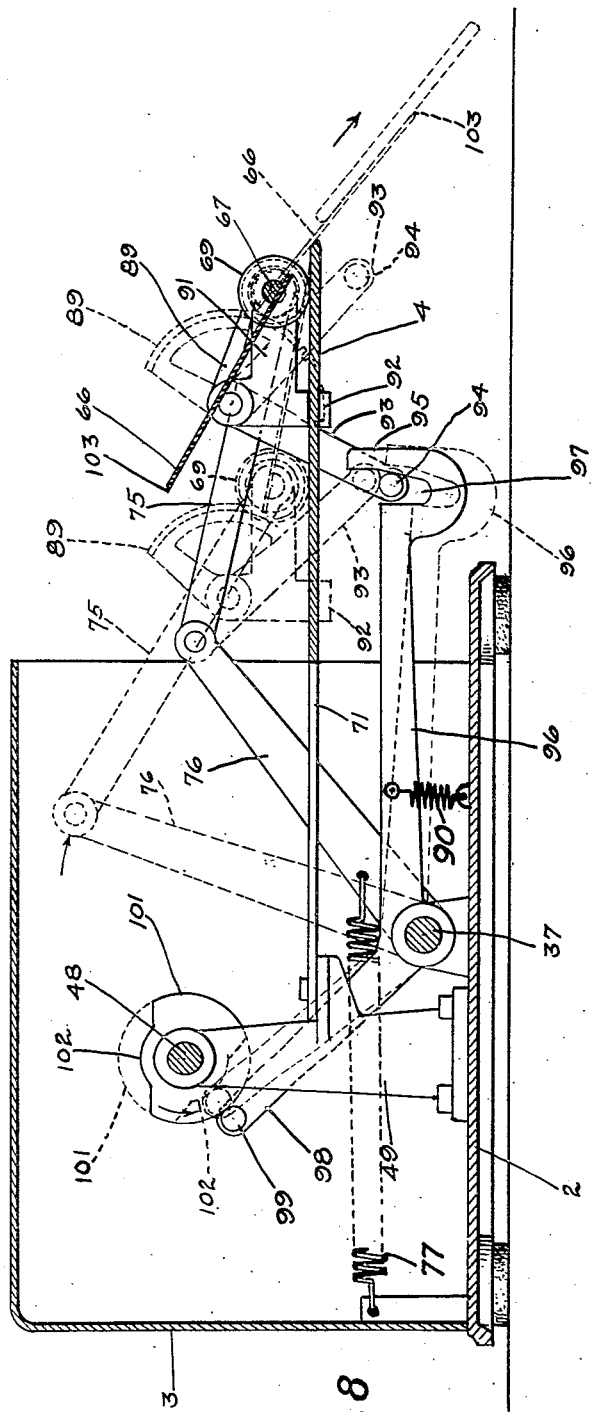

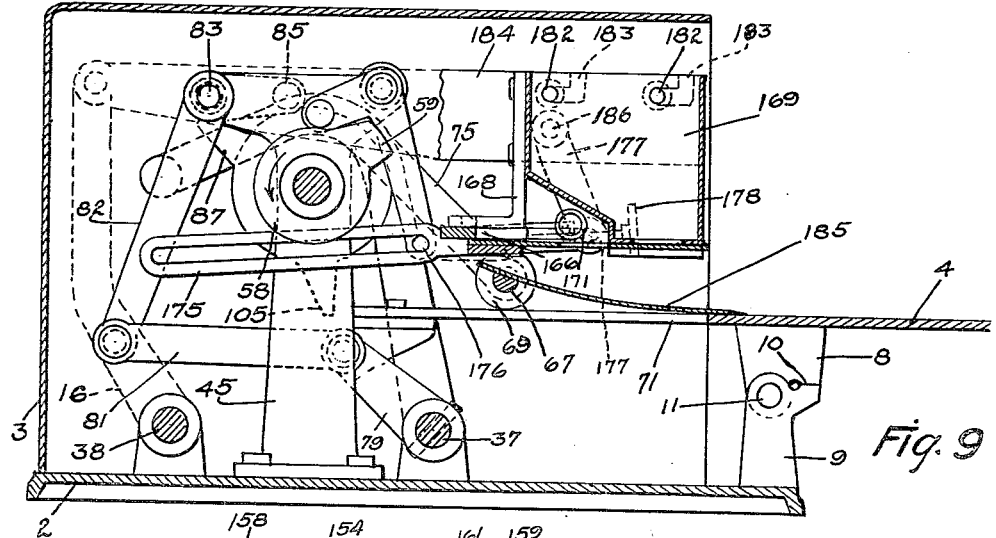
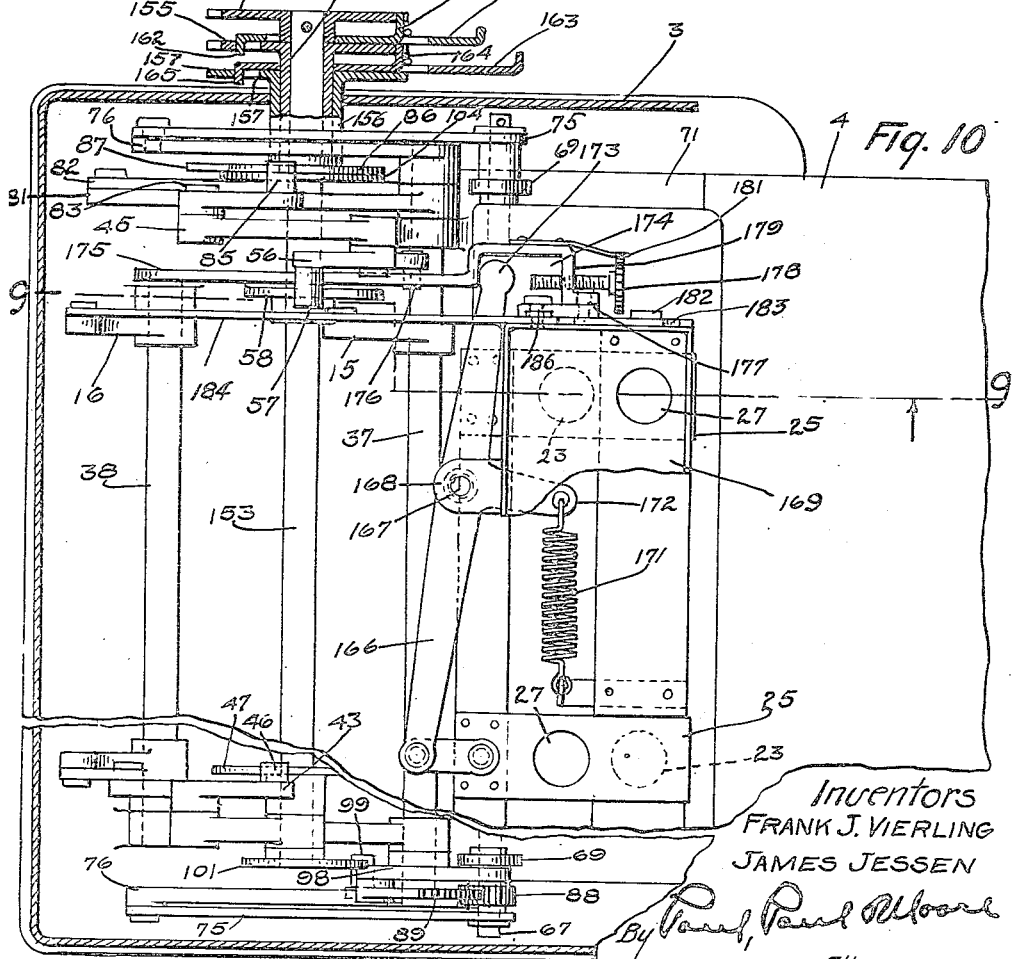

Patented June 9, 1931

1,809,004

UNITED STATES PATENT OFFICE

FRANK J. VIERLING AND JAMES JESSEN, OF MINNEAPOLIS, MINNESOTA, ASSIGNORS TO EDWARD S. HARRISON, OF MINNEAPOLIS, MINNESOTA

MACHINE FOR BAKING CAKES

Application filed January 12, 1928. Serial No. 246,248.

This invention relates to an improved machine for baking cakes, particularly griddle cakes, and an object of the invention is to provide such a machine comprising a griddle and a batter receptacle, the latter having means associated therewith for discharging batter on the griddle, in predetermined quantities and at predetermined intervals; means for automatically turning or inverting the cakes upon the griddle, when baked on one side, and means for automatically removing the cakes from the griddle, when baked.

A further object of the invention is to provide a machine for baking cakes, which broadly includes a griddle, a batter-box adapted to discharge batter upon the griddle to form cakes, means for automatically inverting the cakes upon the griddle, after a predetermined length of time, and means for removing the cakes from the griddle when baked; all of said means operating in timed relation, so that when the machine is started, it will continue to automatically bake griddle cakes until the batter in the batter-box is exhausted, or, until the machine is manually interrupted by an attendant, and the cakes thus baked will be of uniform size and will be uniformly baked on both sides.

A further object is to provide a machine of the class described, having mechanism for automatically discharging batter upon a griddle or hot-plate, in predetermined quantities, to form griddle cakes; allowing the cakes to bake on one side, then inverting or turning the partially baked cakes over on the griddle to bake their opposite sides, and subsequently removing the finished cakes from the griddle and discharging them into a suitable receiving means, after which the cycle of operation is repeated, thus providing such a machine whose operation will be substantially wholly automatic, and which is adapted for continuous service, and is therefore well adapted for use to bake pancakes in restaurants and other places where such cakes are served.

The particular object of the invention, therefore, is to provide a machine adapted automatically to bake pancakes.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 2 is a sectional plan view on the line 2—2 of Figure 6;

Figure 3 is a vertical sectional view on the line 3—3 of Figure 1, showing the means for supporting the batter-box;

Figure 4 is a detailed sectional view illustrating a means for changing the timing of the operating mechanism;

Figure 5 is a detailed sectional view on the line 5—5 of Figure 4;

Figure 8 is a diagrammatic sectional view illustrating the means provided for inverting the cakes upon the griddle;

Figure 9 is a vertical sectional view on the line 9—9 of Figure 10, showing a modified construction; and Figure 10 is a sectional plan view of Figure 9, showing the means for timing the operating mechanism, positioned at one end of the machine.

Figure 1:
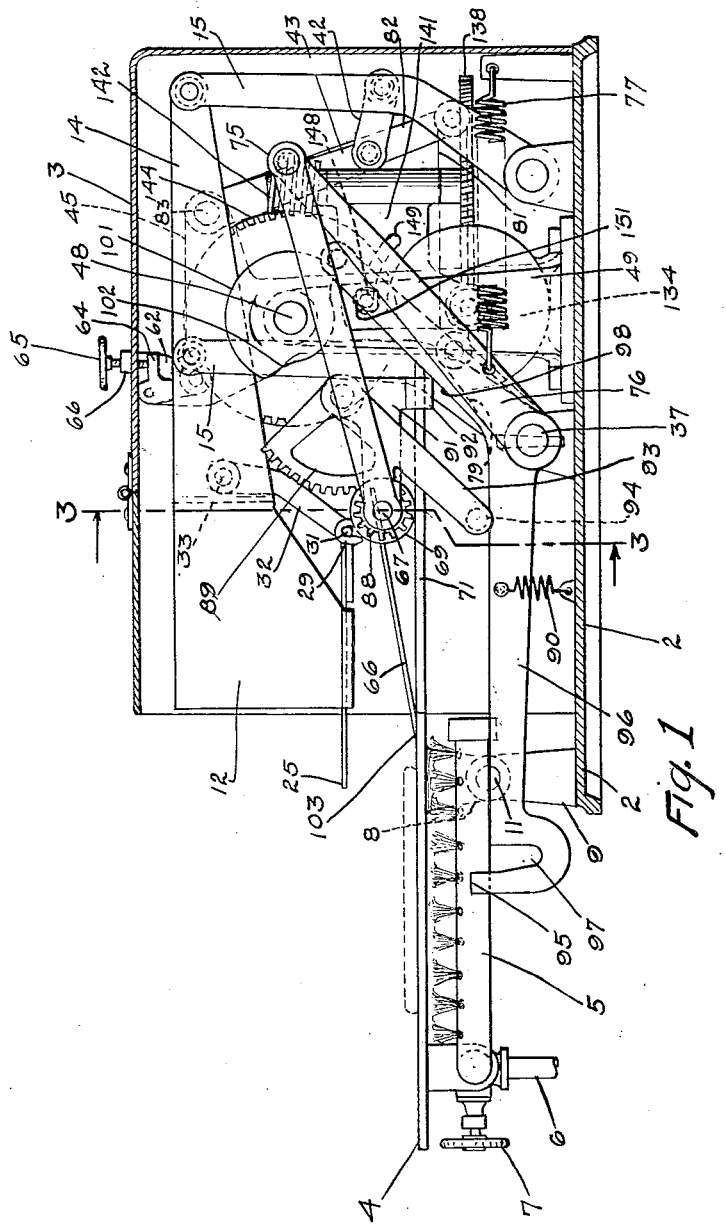
Figure 1 is a vertical sectional view on the line 1—1 of Figure 3, showing the parts in normal position.
Figure 6:
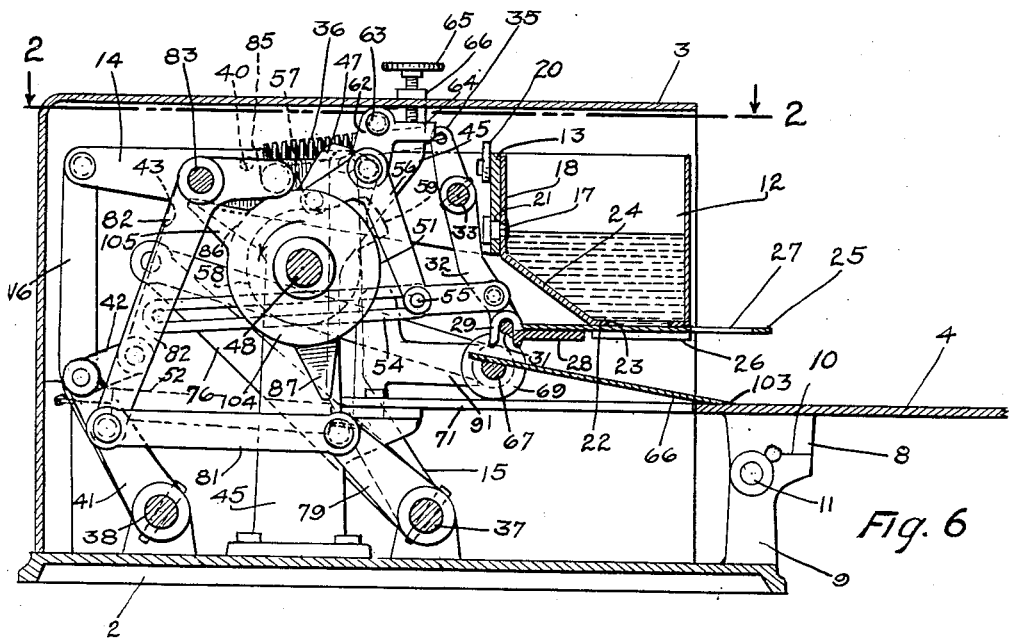
Figure 6 is a vertical sectional view on the line 6—6 of Figure 2, showing the parts in normal position.

The apparatus shown in the accompanying drawings comprises a base member 2 having a housing or casing 3 for enclosing the mechanism mounted upon the base. A suitable griddle or hot plate 4 is provided at one side of the machine as shown in Figures 1, 6, 7, and 8, and has a suitable heating element or burner 5 mounted there-beneath. In Figure 1, we have shown a gas burner of ordinary construction, having a connection 6 for connecting it to a source of gas supply. A valve 7 is provided for controlling the flow of gas to the burner. It is to be understood, however, that other means may be provided for heating the griddle, as for instance, an electric heating element may be used. The griddle 4 is provided with depending lugs 8 having pivotal connections with brackets 9 by means of pivots 11, shown in Figures 6 and 7. A stop 10 is provided upon each lug 9 to limit the downward movement of the griddle 4 as shown in Figure 6. By thus mounting the griddle, it may be folded to an upright position when not in use.

Figure 7:
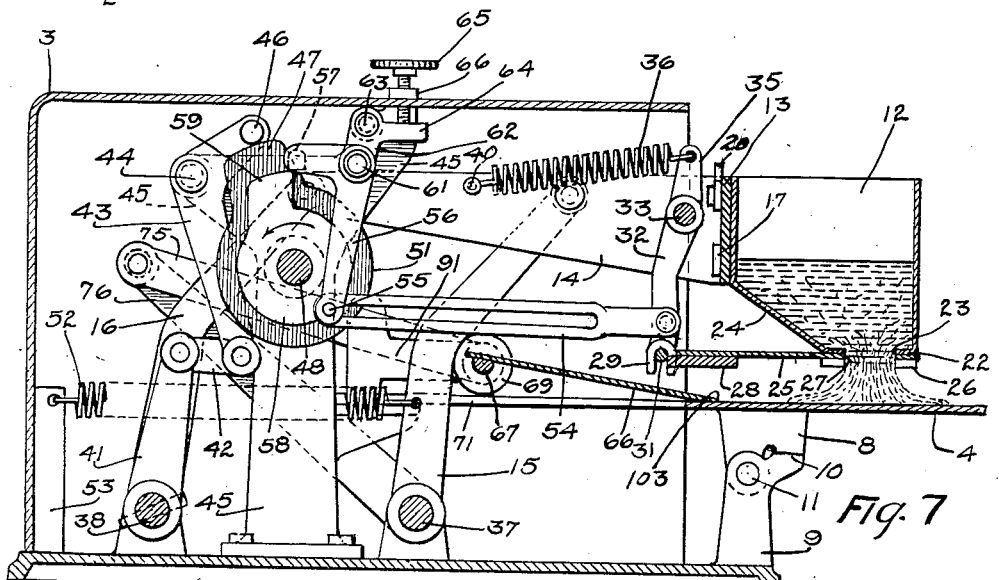
Figure 7 is a similar view on the line 7—7 of Figure 2, showing the batter-box in discharging position.

The machine as shown in the drawings is adapted for baking three cakes at a time. (See Figure 2.) The means provided for discharging batter upon the griddle 4, in predetermined quantities, is best shown in Figures 6 and 7, and comprises a batter-box 12 detachably secured to a bar 13, having spaced legs 14 pivotally supported upon parallel links or arms 15 and 16. Flanged studs 17 are secured to the inner wall 18 of the batter-box, and are adapted to be received in bayonet slots 19 and 21 provided in the supporting bar 13, as shown in Figure 3. By thus supporting the batter-box upon the supporting bar 13, it may readily be removed therefrom for cleaning and other purposes. A latch 20 is pivotally mounted upon the bar 13 and is adapted to engage one of the studs 17 to lock the batter-box to the bar 13.

The horizontal bottom wall 22 of the batter-box is provided with spaced apertures 23 through which batter may be discharged onto the heated surface of the griddle, as shown in Figure 7. The bottom wall portion 24 of the batter-box is inclined as shown so that substantially all of the batter may drain from the box onto the griddle, when the apertures 23 are opened.

The means for discharging batter from the batter-box onto the griddle comprises slide valves 25, mounted in guides 26 provided on the bottom of the batter-box. Each slide 25 has an aperture 27 adapted to be moved into registration with the apertures 23 in the batter-box to permit batter to flow therethrough onto the griddle, as shown in Figure 7. The slides 25 are connected with a bar 28 having hook members 29 adapted detachably to engage a rod 31, secured to the lower ends of a pair of arms 32, secured to a shaft 33 mounted for pivotal movement in the spaced arms 14 of the batter-box supporting member 13. Each arm 32 has an extension 35 to each of which one end of a tension spring 36 is connected, the opposite ends of which are connected to studs 40 secured to the arms 14, as shown in Figure 2. These springs normally hold the arms 32 in the position shown in Figure 6, wherein it will be noted that the slides 25 are in closed position.

In the structure here shown, the batter-box 12 is movably mounted with respect to the griddle 4, and when in inoperative position, is positioned as shown in Figure 6, within the casing 3. From this position, it is movable to the position shown in Figure 7. When the batter-box is moved outwardly to this position, the slides 25 will be moved with respect to the box so that the apertures 27 therein will register with the apertures 23 in the batter-box, causing batter to flow from the box 12 onto the griddle. (See Figure 7.) The parallel links 15 and 16, which support the batter-box, have their lower ends secured to shafts 37 and 38, respectively, which are mounted in apertured lugs provided on the base member 2 of the apparatus. An arm 41 is secured to the shaft 38 intermediately of the arms 16, and has a link 42 connecting it with one end of a bell crank 43, mounted upon a pivot 44 supported upon the upper end of a bracket 45, shown in Figures 3 and 7. The other end of the bell crank 43 has a stud 46 mounted therein which is adapted to be engaged by a cam 47, mounted upon a cam shaft 48 rotatably mounted in brackets 49 and 50, also secured to the base member 2. A collar 60 is secured to the cam shaft 48 to prevent axial movement of the shaft. When the batter-box is in normal position, as shown in Figure 6, the stud 46 will ride upon the concentric portion 51 of the cam disk 47. In this figure, the cam 47 is about to engage the stud 46 to advance the batter-box to its batter-discharging position. In Figure 7, the cam 47 has engaged the stud 46 to move the batter-box forwardly. Tension springs 52 connect the arms 15 with upright lugs 53 preferably secured to the base member 2. These springs function to return the batter-box to the position shown in Figure 6. The advance movement of the batter-box will therefore be against the tension of the two springs 52.

The means provided for moving the slides 25 to batter-discharging positions, when the batter-box is moved outwardly, is also shown in Figures 6 and 7. Such means comprises a slotted link 54 having one end pivotally connected to one of the depending arms 32, engaging the rod 31. The opposite end of this link is slidably engaged with a pin 55, terminally mounted in the lower end of a bell crank 56, having a pin or stud 57 mounted in the other end thereof adapted to engage a cam disk 58, having a raised portion 59 adapted to engage the stud 57 to actuate the bell crank 56. The bell crank is pivotally mounted upon a stud 61, carried upon an adjustably mounted hanger 62, mounted upon a pivot 63 secured to the upper portion of the bracket 45. A finger 64 is provided upon the hanger 62 adapted to be engaged by an adjusting screw 65, mounted in a lug 66 preferably integrally formed with the upper portion of the bracket 45. This lug 66 preferably extends through the upper wall of the casing 3 so that the adjusting screw 65 is positioned exteriorly of the casing where it may be conveniently operated by an attendant. The above described mechanism, that is, the slotted link 54, bell crank 56, cam disk 58, and stud 57 operate to position the slides 25 in such a manner that when the batter-box nears the end of its forward movement, the apertures 23 and 25, provided respectively in the bottom of the batter-box and the slides 25, will be moved into registration to cause batter to be discharged upon the griddle, as shown in Figure 7.

The operation of the slides 25 may be explained with reference to Figures 6 and 7, and is as follows: when the cam 47 engages the stud 46 on the bell crank 43, the parallel links or arms 15 and 16 will be moved forwardly from the positions shown in Figure 6 to that shown in Figure 7, thereby advancing the batter-box to its discharging position. By observing these two figures, it will be noted that the slide-operating arm 32 is carried by the arms 14 to which the arms 15 and 16 are pivotally connected, and to which the batter-box supporting member 13 is also secured. Thus, when the batter-box 12 moves forwardly, the arm 32 will also be moved forwardly, thereby translating the slotted arm 54, the opposite end of which will slide upon the pin 55 secured to the lower end of the bell crank 56. The cams 47 and 59 are so arranged upon the cam shaft 48 that the bell cranks 43 and 56 will be operated at about the same time, thereby causing the lower end of the bell crank 56 to be moved from the position shown in Figure 6 to that shown in Figure 7, before the batter-box reaches its discharging position shown in Figure 7. The length of the slot in the arm 54 is such that one end thereof will engage the pin 55 slightly before the batter-box reaches the end of its forward movement, thereby interrupting the forward movement of the slides 25, which will cause the apertures 23 in the bottom of the batter-box to move into registration with the apertures 27 in the slides as shown in Figure 7, causing batter to flow from the box. During the final forward movement of the batter-box, the slide operating arm 32 will oscillate with respect to the batter-box against the tension of the springs 36. The batter-box 12 will remain in its forward position while the stud 46 is riding upon the high portion of the cam 47. As soon as the cam 47 has rotated sufficiently to cause the stud 46 to become disengaged therefrom, the springs 52 will cause the batter-box to be returned to its normal position shown in Figure 6.

The quantity of batter discharged from the batter-box onto the griddle is controlled by the closing of the slides 25 while the batter-box is in discharging position. The closing of the slides 25 may be advanced or retarded as desired by means of the adjusting screw 65. When this screw is moved downwardly with respect to the upper wall of the casing 3, the pivot 61 will be moved in the direction of travel of the cam 59, thereby causing the slides to remain open a relatively longer period of time, resulting in a larger quantity of batter being discharged upon the griddle. Conversely, when the adjusting screw 65 is moved upwardly with respect to the casing 3, the pivot pin 61 will be moved in the opposite direction, thus causing the cam 59 to move out of engagement with the stud 57 sooner than when the pivot 61 is moved in the opposite direction, resulting in the springs 36 moving the slides 25 into closing position earlier in the cycle of operation, thus reducing the quantity of batter discharged from the batter-box onto the griddle. The adjusting screw 65 thus provides means for varying the quantity of batter discharged upon the griddle.

The means provided for inverting or turning the cakes over upon the griddle, after they have been baked sufficiently upon one side, consists of a peel or blade 66, secured to a rod 67 having rollers 68 and 69 rotatably mounted thereon, which are adapted to travel upon tracks 71, suitably secured to the base member 2. These tracks 71 have their outer ends substantially abuttingly engaging the inner edge of the griddle 4, and have their upper surfaces alined with the upper surface of the griddle. (See Figures 1 and 2.) Links 75 connect the ends of the shaft 67 with a pair of arms 76, secured to the shaft 37 upon which the parallel arms 15 are loosely mounted. Springs 77 constantly urge the arms 76 rearwardly to the full line positions shown in Figures 6 and 7.

A crank arm 79 is secured to the shaft 37 and has a link 81 pivotally connecting it with one end of a bell crank 82, mounted upon a pivot pin 83 supported in the upper portion of the bracket 50. (See Figure 6.) The opposite end of the bell crank 82 has a stud 85 normally riding upon a cam disk 86, secured to the cam shaft 48. This cam disk is provided with a raised portion 87 adapted to engage the stud 85 to oscillate the bell crank 82. Such engagement of the cam 87 with the stud 85 will cause the arms 76 to be moved forwardly to the full line position shown in Figure 8, thereby causing the peel 66 also to be moved forwardly.

The cakes are inverted upon the griddle as a result of rotary movement being imparted to the peel 66. To thus partially rotate the peel with respect to the griddle 4, a gear-and-pinion mechanism is provided, as shown in Figures 1, 2, and 8. A pinion 88 is secured to the shaft 67, preferably adjacent the right hand side of the apparatus, when viewed as shown in Figure 2. This pinion constantly meshes with a gear segment 89, rotatably mounted upon a carriage 91 having one end supported upon the shaft 67 and having its opposite end slidably engaged with one end of the griddle 4 as indicated at 92 in Figure 8. The carriage 91 therefore is movable backwardly and forwardly with the shaft 67, as the latter is operated by the links 76.

An arm 93 is provided upon the gear segment 89 and has a pin 94 terminally mounted therein which is adapted to engage a detent 95, terminally provided upon a lever 96 which also is pivotally mounted upon the shaft 37. This lever has a spring 90 connecting it with the base member 2 to constantly urge the arm downwardly. A recess 97 is provided in the lever 96 adjacent to the detent 95. This recess is adapted to receive the pin 94 when the peel is moved forwardly to turn the cakes. The lever 96 is provided with an oppositely extending end portion 98 having a pin 99 therein adapted to ride upon a cam disk 101, as shown in Figure 8. The cam disk 101 is provided with a cutaway portion 102, as shown.

The operation of the peel is as follows: when the batter-box is in its normal position, shown in Figure 6, the peel will be positioned as also shown in this figure. Upon initial movement of the cam 47 from the position shown in Figure 6, the batter-box 12 will be moved forwardly to the position shown in Figure 7, as a result of the cam 47 engaging the pin 46. During such movement of the batter-box, the slides 25 will also be operated as a result of the cam 59 engaging the stud 57, thereby causing predetermined quantities of batter to be discharged upon the griddle, after which the batter-box recedes to its normal position. Continued rotation of the cam shaft will cause the cam 87 to engage the stud 85 in the bell crank 82, causing the latter to rock the shaft 37 which results in forward movement of the peel-supporting shaft 67. During the initial forward movement of the peel 66, the pin 94 on the gear segment arm 93 will ride upon the upper edge of the lever 96, which is substantially parallel with the upper surface of the griddle 4 and the tracks 71, thereby causing the shaft 67 to be moved forwardly without any rotary motion being imparted thereto. During such forward movement of the peel 66, the pin 99 in the oppositely extending end portion of the lever 96 will be engaged with the high portion of the cam disk 101, thereby retaining the lever 96 in the position shown in Figures 1 and 8. It therefore follows that when the pin 94 in the gear segment arm 93 engages the detent 95, forward movement of the pin 94 will be interrupted, thereby causing the gear segment 89 to be relatively rotated, resulting in rotary motion being imparted to the peel-supporting shaft 67, as a result of the pinion 88 being in mesh with the gear segment 89. Continued forward movement of the peel-supporting shaft 67 will cause the pin 94 on the gear segment arm to move downwardly into the recess 97 provided adjacent to the detent 95, thereby causing the peel 66 to be partially rotated from the position shown in Figure 1 to that shown in Figure 8. Such partial rotation of the peel will cause the cakes to be inverted or turned over upon the griddle. The leading edge 103 of the peel preferably is sharpened and slides upon the surface of the griddle so that when the peel is initially moved forwardly, it will slide under the cakes and thus remove them from the surface of the griddle. After the cakes have thus been removed from the griddle by engagement with the peel, the latter is rotated to the position shown in Figure 8, thereby causing the cakes to be returned to the griddle in an inverted position. The peel then returns to its normal position, shown in Figure 1.

The final step in each cycle of operation resides in removing the finished cakes from the griddle 4 and discharging them into or onto a suitable receiving means. This portion of each cycle of operation is effected by means of a cam 105, provided upon a disk 104 mounted adjacent to the cam disk 86. The stud 85 of the bell crank 82 is adapted to be engaged by the cam 105. The circumferential spacing between the cams 87 and 105 determines the length of time which the cakes are allowed to bake or remain upon the griddle, subsequent to being inverted. As soon as the cam 105 engages the pin 85 of the bell crank 82, the peel is again moved forwardly. However, before the pin 94, provided in the lower end of the gear segment arm 93, reaches the detent 95 of the lever 96, the cam 101 will have rotated sufficiently to cause the pin 99 to drop into the cut-away or recessed portion 102 of the cam 101, thereby moving the detent 95 downwardly out of the path of the pin 94 with the result that no movement is imparted to the gear segment 89, and consequently the peel-supporting shaft 67 is not rotated. During this forward movement of the peel, the latter will continue forwardly in the position shown in Figure 1, the knife edge 103 remaining in engagement with the surface of the griddle until it passes beyond the outer edge of the griddle and into the dotted line position shown in Figure 8. When the peel thus reaches the limit of its forward movement, the cakes will be discharged therefrom, as indicated in dotted lines and by the arrow in Figure 8, into a suitable receiving means, not shown. As the cam 105 moves out of engagement with the stud 85 in the bell crank 82, the spring 77 will return the peel to its normal position shown in Figures 1, 6, and 7, thus completing one cycle of operation.

Means are preferably provided for relatively changing the timing of the movements of the various parts with reference to one another. This may be desirable for various reasons, as for example, the batter may vary in consistency; the temperature of the griddle may also vary, in which case it may be necessary to vary the time allowed for the cakes to bake. It may also be necessary to allow the cakes to bake longer on one side than on the other side in order that they will be baked uniformly brown on both sides. The means here shown for thus relatively varying the time allowed for the cakes to bake on each side, is shown in Figures 3, 4, and 5. As here shown, the cam disk 86 is mounted upon a flanged hub 106 rotatably mounted upon the cam shaft 48. The hub 106 has a beveled gear 107 meshing with a similar gear 108 rotatably mounted upon a shaft 109, having a relatively smaller pinion 111 terminally secured thereto which meshes with a pinion 112 mounted upon the cam shaft 48. The gears 111 and 112 are secured to their respective shafts so that when the cam shaft 48 is rotated, rotary motion will also be imparted to the shaft 109. A notched disk 113 is secured to the upper end of the shaft 109 and has a series of peripheral notches 114, as shown in Figure 5. A similar notched disk 115 is terminally provided upon the upper end of a sleeve 116, the lower end of which is connected with the pinion 108. The sleeve 116 is rotatable upon the shaft 109. A second sleeve 117 is mounted upon the sleeve 116 and has a beveled gear 118 at its lower end meshing with a similar gear 119, secured to the cam 104. A disk 121 is also provided upon the upper end of the sleeve 117.

A locking member 123 is mounted between the disk 113 and the disk 115, and a similar locking member 124 is mounted between the disk 115 and the disk 121. The shaft 109 and sleeves 116 and 117 are mounted and supported in a bearing projecting from the bracket 50. The locking member 123 is mounted upon the hub of the notched disk 113 adjacent to the notched disk 115, and has a downwardly bent end portion 125 seated in a recess 126 provided in the periphery of the disk 115. The end portion 126 extends beyond the lower surface of the disk 113 and has one end of a spring member 127 seated thereagainst. The other end of this spring is secured to the disk 115 as shown in Figure 5. A detent 128 is also provided upon the locking member 123 and extends upwardly into position to engage the notched periphery of the disk 113 as shown in Figure 4. The spring 127 normally holds the locking member 123 in the position shown in Figures 4 and 5, wherein it will be noted that the detent 128 is in locking engagement with the disk 113. When the locking member is thus positioned, it will be seen by reference to Figure 4, that the cam 86 will be operatively connected with the shaft 48 through the pinions 111 and 112, shaft 109, disk 113, detent 128, locking member 123, the downwardly bent end portion 125 seated in the recess 126, disk 115, sleeve 116, gear 107 and the hub 106 to which the cam 86 is secured.

The locking member 124 similarly has a downwardly bent end portion 129 seated in a recess 131 provided in the disk 121. A spring 132, secured to the disk 121, retains the locking member 124 in its normal position, as shown in Figure 5, in which position it will be seen that the detent 133, provided upon the locking member 124 will be in locking engagement with the notched periphery of the disk 115. This locking member operatively connects the cam 104 with the cam shaft 48 through the pinions 111 and 112, shaft 109, disk 113, locking member 123, disk 115, the locking member 124, which locks the disk 115 to the disk 121, the sleeve 116, gears 118 and 119, and the cam 104 which is secured to the gear 119.

The above described mechanism provides means for relatively varying the circumferential spacing between the cams 87 and 105. Such adjustment of the two cams is accomplished by changing the relative positions of the locking members 123 and 124 with respect to their complementary disks 113 and 115.

The means provided for operating the cam shaft and therefore the entire apparatus, is here shown as comprising a motor 134 suitably mounted upon the base 2 as shown in Figures 1, 2, and 3. This motor has a shaft 135 upon which a worm 136 is mounted. The outer end of the shaft 135 is supported in a bearing 137 provided in the bracket 45. A worm wheel 138 is secured to a shaft 139 supported in a bracket 141 mounted for swinging movement upon the motor shaft 135. A worm 142 is secured to the upper end of the shaft 139 and is adapted to mesh with one or the other of a pair of worm wheels 143 and 144 mounted upon a hub 145 which is slidably mounted upon the cam shaft 48 as shown in Figure 4. The hub 145 is prevented from relative rotation upon the cam shaft 48 by means of a feather key 146. A set screw 147 provides means for locking the gears 143 and 144 to the cam shaft. Referring to Figures 1, 2, and 3, it will be noted that the large worm wheel 144 is engaged with the worm 142, thus causing the cam shaft to operate at slow speed when the machine is operating. To increase the speed of the cam shaft, the set screw 147 is loosened and the hub 145 moved to the dotted line position shown in Figure 4, thus bringing the smaller worm wheel 143 into engagement with the worm 142. A stud 148 is mounted in the bracket 141 and passes through a circular slot 149 provided in the bracket 141. A lock nut 151 is terminally provided upon the stud 148 to lock the bracket 141 in its adjusted positions. When the nut is loosened, the bracket 141, after the worm gear 143 has been moved into alinement with the worm 142 may be swung upwardly from the position shown in Figure 1 to bring the worm 142 into meshing engagement with the worm 143. The nut 151 is then tightened to secure the bracket 141 in such position. When the worm 142 is thus moved into driving engagement with the smaller worm wheel 143, the speed of the cam shaft will be increased, thus increasing the speed of the entire apparatus.

Figures 9 and 10 illustrate a modified form wherein the means provided for relatively changing the positions of the cams 87 and 105 upon the cam shaft and with respect to one another is mounted at one end of the machine and not at the top thereof as shown in Figure 4. In the structure shown in Figure 10, the cam shaft 153 is extended and projects through one end of the casing 3, a sleeve 154 is mounted upon the projecting end of the cam shaft and has a notched disk 155 provided at one end thereof, and to the inner end of this sleeve, the cam disk 104 is secured. This disk supports the cam 105 which controls the removal of the cakes from the griddle. A sleeve 156 is rotatably mounted upon the sleeve 154 and has a disk 157 secured to the outer end thereof. To the inner end of this sleeve, the cam disk 86 is secured which supports the cam 87 controlling the turning of the cakes upon the griddle. A notched disk 158 is terminally secured to the projecting end of the cam shaft as shown in Figure 10. A spring actuated locking member 159 is mounted between the disks 155 and 158 and has a detent 161 engageable with the notched periphery of the disk 158. The member 159 also has a lug 162 received in an aperture provided in the disk 155 to prevent the member 159 from relatively rotating with respect to the disk 155. A similar spring-actuated locking member 163 is mounted between the disks 155 and 157, and this member, like the locking member 159, has a detent 164 adapted to engage the notches in the periphery of the disk 155. The locking member 163 also has a lug 165 received in an aperture in the disk 157 to prevent it from relatively rotating with respect to the disk 157. The function of the locking members 159 and 163 is similar to that of the members 123 and 124 shown in Figures 4 and 5.

The means provided for actuating the slides 25 has also been slightly modified in the structure shown in Figure 10. As here shown, the means provided for timing the opening and closing of the slides 25 to control the discharging of the batter from the batter-box, consists of a lever 166 pivotally mounted upon a pin 167 supported by a bracket 168 secured to the batter-box 169 as shown in Figure 9. A spring 171 has one end connected to the bottom of the batter-box and its other end to a lug 172 provided upon the lever 166 as shown in Figure 10. This spring tends to retain the slides 25 in the positions shown in Figure 10. The opposite end of the lever 166 has a ball-shaped head 173 seated in a recess 174 provided in a slotted arm 175. The slotted end of the arm is adapted to receive a pin 176 corresponding to the pin 55 shown in Figures 6 and 7. The opposite end of the arm 175 is pivotally connected to a link 177, pivoted to one end of the batter-box as indicated at 186 in Figure 10. An adjusting screw 178 is received in threaded engagement with the off-set end portion 179 of the arm 175 and is adapted to terminally engage the head 173 provided upon one end of the arm 166. A spring member 181 frictionally retains the adjusting screw 178 in its adjusted positions. The width of the gap between the end of the adjusting screw 178 and the head 173 of the arm 166 determines the degree of opening of the apertures 23 and 27 in the bottom of the batter-box, and therefore the quantity of batter discharged upon the griddle. When the adjusting screw is screwed inwardly to reduce the width of the gap between the end thereof and the head 173 of the arm 166, the apertures 23 and 27 respectively in the bottom of the hopper and the slides, will more nearly be brought into full opening, thus causing more batter to be discharged onto the griddle each time the slides are operated. Conversely, when the adjusting screw is moved outwardly to increase the width of the gap between the inner end thereof and the head 173, the apertures 23 and 27 will not be moved into full opening position, thereby causing less batter to be discharged onto the griddle.

The batter-box, shown in Figures 9 and 10, is detachably supported upon studs 182 secured to each end of the batter-box 169. The studs are demountably received in bayonet slots 183 provided in arms 184, these arms corresponding to the arms 14 shown in the previous figures.

The peel 185 shown in Figure 9, differs from the one shown in the previous figures, in that it is slightly curved or bent downwardly in order to more readily slide in under the cakes as the peel is moved forwardly.

The novel cake baking machine, above described, is particularly well adapted for use to automatically bake griddle cakes. It is so constructed that when the batter-box is supplied with batter and the motor is started, the machine will continue to automatically bake griddle cakes until the supply of batter is exhausted or until the machine is interrupted by an attendant. The operating mechanism is so designed that the various operations in each cycle of operation may be properly timed with relation to one another, so that the cakes will be uniformly baked on both sides. The size of the cakes may also be varied by allowing more or less batter to be discharged upon the griddle at the beginning of each cycle of operation. In the drawings, we have shown the machine adapted for making three cakes at a time. The number of cakes baked at each cycle of operation, however, may be varied if desired, as the only alteration required to vary the number of cakes baked is to vary the number of discharge openings in the bottom of the batter-box.

I claim as my invention:

1. In a machine for baking cakes, the combination of a griddle, a batter-box, means for discharging batter onto the griddle in predetermined quantities, a peel, means automatically operable to advance said peel after a predetermined length of time, and means made operable by forward movement of said peel to cause the latter to be partially rotated, whereby it may invert the cakes upon said griddle, and mechanism capable of causing the peel to remove the cakes from the griddle, upon its succeeding forward movement.

2. In a machine for baking cakes, the combination of a griddle, a batter-box, means for discharging batter onto the griddle in predetermined quantities, a peel mounted for forward and backward movement over said griddle, and cams operable to cause said peel to invert the cakes and subsequently to remove them from the griddle, and means for relatively adjusting said cams with respect to each other to vary the baking of the cakes.

3. A machine for baking cakes, comprising in combination, a base member, a griddle mounted thereon, a batter-box, means for discharging batter onto the griddle in predetermined quantities, a carriage, a peel mounted on said carriage and having one edge normally engaged with the surface of said griddle, a cam mechanism for moving the carriage forwardly and backwardly over the griddle and means mounted on said carriage adapted to be actuated by movement of the carriage to partially rotate the peel at alternate forward movement thereof to cause the latter to invert the cakes upon the griddle.

4. A machine for baking cakes, comprising in combination, a base member, a griddle pivotally mounted thereon, means for discharging batter onto said griddle in predetermined quantities, a carriage mounted for forward and backward movement over said griddle, a peel supported on said carriage and mechanism mounted upon said carriage and operable to partially rotate the peel at alternate forward movements thereof, to cause the latter to invert the cakes upon the griddle, and means rendering said peel capable of removing cakes from the griddle.

5. A machine for baking cakes, comprising in combination, a base member, a griddle pivotally mounted at one side thereof, means for discharging batter onto said griddle in predetermined quantities, a carriage mounted for forward and backward movement over the griddle, a peel supported on said carriage and normally having one edge engaged with the surface of the griddle, and a gear mechanism mounted upon said carriage for partially rotating the peel, upon alternate forward movements thereof, to cause the latter to invert the cakes upon the griddle, and cam means for operating said mechanism.

6. A machine for baking cakes, comprising in combination, a base member, a griddle mounted thereon, means for discharging batter onto the griddle in predetermined quantities, a carriage movably mounted over said griddle, a peel mounted upon said carriage and adapted for rotary movement, a cam for moving the carriage forwardly and backwardly, an arm engageable with means on said carriage for rotating the peel upon alternate forward movements thereof to invert the cakes upon said griddle and means causing said peel to remove the cakes from the griddle upon its next following forward movement.

7. A machine for baking cakes, comprising in combination, a base member having a griddle mounted thereon, a batter-box normally positioned over and to one side of the griddle, means for supporting said batter-box, a cam for causing said means to move the batter-box forwardly to batter-discharging position over the griddle, means in the bottom of the batter-box made operable by forward movement of the latter to cause batter to be discharged onto the griddle in predetermined quantities, a peel mounted for forward and backward movement over said griddle, means for imparting rotary movement to said peel upon the initial forward movement thereof in each cycle of operation, to cause the peel to invert the cakes upon the griddle, and means made operable during the final forward movement of said peel in each cycle of operation to cause the peel to remove the cakes from the griddle.

8. A machine for baking cakes, comprising in combination, a griddle, a batter-box movably mounted thereover, means in the bottom of said batter-box for discharging batter onto the griddle in predetermined quantities, a peel mounted for forward and backward movement over the griddle and having a pinion and gear segment connected therewith, a cam for operating the peel, an arm positioned to be engaged by means on said segment to cause the peel to be rotated upon a forward movement thereof to cause it to invert the cakes upon the griddle, and means made operable upon the succeeding forward movement of the peel to cause it to remove the cakes from the griddle.

9. A machine for baking cakes, comprising in combination, a griddle, a batter-box movably mounted thereover, means for discharging batter onto the griddle in predetermined quantities, a peel mounted for forward and backward movement over said griddle and normally having one edge engaged therewith, means for imparting rotary movement to the peel upon alternate forward movements thereof, to cause the latter to invert the cakes upon the griddle, said means being inoperable upon alternate following forward movements of the peel, whereby the latter will remove the cakes from the griddle, and means for relatively timing the movements of the peel to regulate the baking of the cakes upon opposite sides.

10. A machine for baking cakes, comprising in combination, a griddle, a batter-box movably mounted thereover, means for discharging batter onto the griddle in predetermined quantities, a peel mounted for forward and backward movement over said griddle and normally having one edge engaged therewith, a carriage for supporting the peel, a pinion at one end of the peel, a gear segment rotatively mounted upon said carriage and engaged with said pinion, an arm connected with the segment, a movable detent adapted to be engaged by said arm upon alternate forward movements thereof, whereby said segment will be operated to partially rotate the peel to cause the latter to invert the cakes upon the griddle, and means for moving said detent out of the path of said arm upon alternate following forward movements of the peel, whereby the peel will continue forwardly without rotation and remove the cakes from the griddle.

11. A machine for baking cakes, comprising in combination, a base member having a griddle mounted thereon, a batter-box normally positioned over and to one side of the griddle, parallel arms for supporting said batter-box, a cam for operating said arms to move the batter-box forwardly to batter-discharging position over the griddle, slide valves in the bottom of the batter-box, a cam for operating said valves to discharge batter onto the griddle in predetermined quantities, a peel operatively mounted over said griddle and adapted to make two complete forward and backward movements during each cycle of operation, means for imparting rotary movement to said peel upon its initial forward movement to cause it to invert the cakes upon the griddle, and means for actuating said peel during the final forward movement thereof in each cycle of operation, whereby it will remove the cakes from the griddle and discharge them into a suitable receiving means.

In witness whereof, we have hereunto set our hands this 5th day of January, 1928.

FRANK J. VIERLING.
JAMES JESSEN.